United States Patent [19]

Sammis

[11] 4,038,123

[45] July 26, 1977

[54] METHOD FOR PRINTING A COLOR DESIGN ON A RELEASE PAPER FOR HEAT TRANSFER TO A FABRIC MATERIAL

[75] Inventor: George L. Sammis, Mason City, Iowa

[73] Assignee: Mach III, Inc., Mason City, Iowa

[21] Appl. No.: 661,811

[22] Filed: Feb. 27, 1976

[51] Int. Cl.$^2$ .......................... B44C 1/16; B32B 27/12; B32B 31/20; B41M 3/12

[52] U.S. Cl. .................................... 156/240; 101/129; 101/211; 101/426; 101/450; 156/246; 156/277; 156/333; 260/23 XA; 260/31.8 R; 264/132; 264/DIG. 60; 427/152; 427/265; 428/914

[58] Field of Search ............... 156/240, 238, 277, 333, 156/231, 246; 427/148, 152, 207 A, 207 C, 207 D, 265; 260/23 XA, 23 EM, 31.8 R; 428/914, 200, 349; 101/115, 171, 211-213, 426, 450, 129; 264/132, DIG. 60; 35/26

[56] References Cited

U.S. PATENT DOCUMENTS

| | | | |
|---|---|---|---|
| 3,922,435 | 11/1975 | Asnes | 156/240 X |
| 3,928,500 | 12/1975 | Kraft et al. | 260/23 XA X |
| 3,931,076 | 1/1976 | Rubin | 260/23 XA |
| 3,941,636 | 3/1976 | Drout et al. | 156/240 X |
| 3,953,635 | 4/1976 | Dunning | 156/240 X |

FOREIGN PATENT DOCUMENTS

| | | | |
|---|---|---|---|
| 1,393,992 | 5/1975 | United Kingdom | 427/148 |

*Primary Examiner*—William A. Powell
*Assistant Examiner*—Thomas Bokan
*Attorney, Agent, or Firm*—Rudolph L. Lowell

[57] ABSTRACT

A predetermined design for heat transfer to a fabric material is produced in color on a release paper by offset printing. To intensify or bring out the colors in the offset printed design the separate color portions thereof are outlined or accentuated by a color of a darker or deeper shade by silk screen printing the outlines with a black colored plastisol material. This design, complete with the bordered or outlined silk screened portions, and corresponding to the color design as it will appear on the fabric material, is then coated or covered with a thin film of a white colored plastisol material having an affinity for both the color design and a fabric material. When subjected to pressure and heat the design is transferred from the release paper to a fabric material.

4 Claims, 8 Drawing Figures

METHOD FOR PRINTING A COLOR DESIGN ON A RELEASE PAPER FOR HEAT TRANSFER TO A FABRIC MATERIAL

SUMMARY OF THE INVENTION

This invention provides an efficient and economical method for printing a color design on a release paper for transfer to a fabric material such that the transferred design approximates in appearance a fabric design directly produced on the fabric by a silk screen printing process. It also approximates in appearance a heat transfer produced entirely by the silk screen printing method. The color design is imprinted on the release paper by an offset printing process and the colors thereof highlighted or brought out by silk screening a black border or outline about or within the separate color portions of the design. These color highlights are maintained when the design is transferred to the fabric under application of pressure and heat.

DETAILED DESCRIPTION OF THE INVENTION

Figure 1:
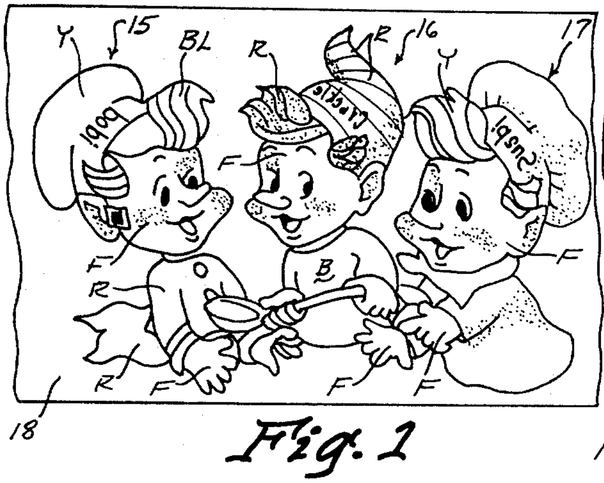
FIG. 1 shows a finished offset printed color design with a silk screened border outline imprinted on a release paper.

Referring to FIG. 1 of the drawings, there is shown a color printed design prepared in accordance with the method of this invention and wherein the colored portions of the illustrated three characters 15, 16 and 17 are printed by an offset printing process utilizing the basic colors of blue, yellow and red.

The offset printing of the colors is applied to a release paper 18 which may be Patapar Transfab parchment 45-31T, available from Bristol Parchment Company of Bristol, Pa. 19007. In the illustrated design, the yellow colored portions are indicated by the letter Y; blue colored portions by the letter B; red colored portions by the letter R; flesh colored portions by the letter F; and black colored portions by the letters BL.

Figure 2:
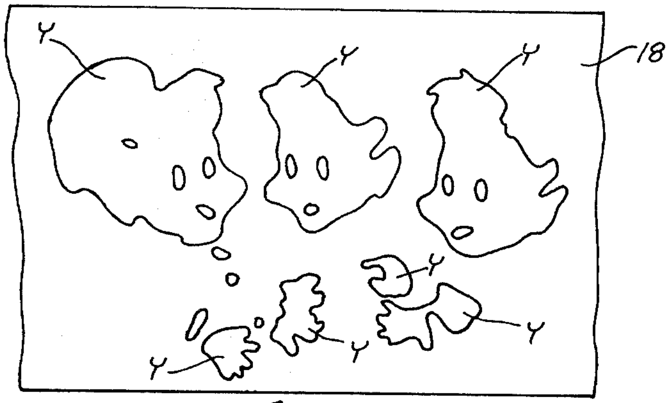
FIG. 2 shows the design portions of a base yellow color for the finished design, shown in FIG. 1.
Figure 3:
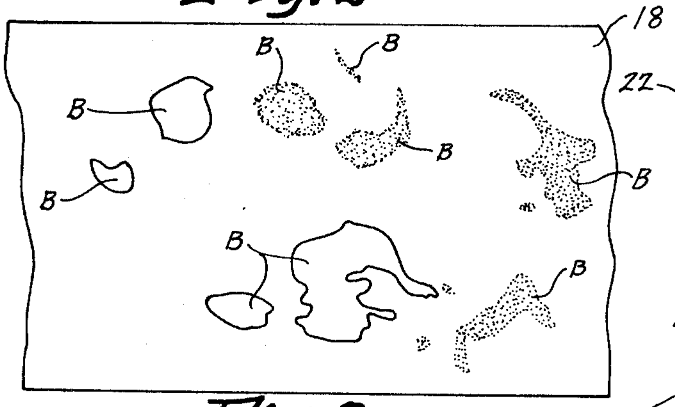
FIG. 3 shows the design portions of a base blue color for the FIG. 1 design.

To obtain this coloring pattern there is initially offset imprinted on the release paper 18 the yellow design portions shown in FIG. 2. It will be seen that the yellow color, in addition to standing alone in the design showing of FIG. 1, provides the base for the finished flesh color F, also shown in FIG. 1. Superposed in a registered relation with the yellow offset printed design portions of FIG. 2, and also by offset printing are the blue colored design portions shown in FIG. 3. Additionally to the blue colored portions B, appearing in the finished design of FIG. 1, the blue color forms a base for the dark colored hair BL of the character 15 in FIG. 1.

Figure 4:
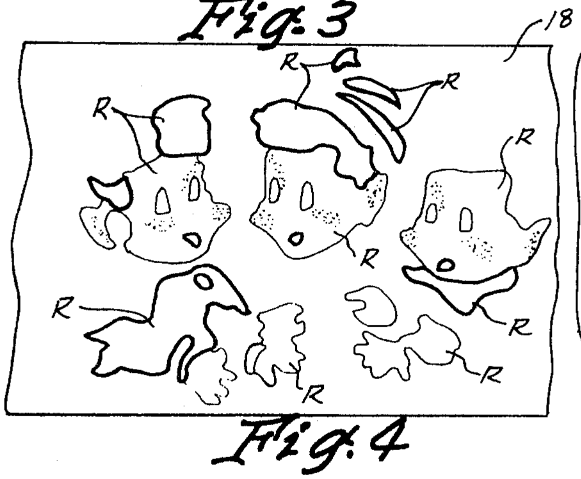
FIG. 4 shows the design portions of a base red color for the finished design of FIG. 1.

The final color in composing the color design of FIG. 1 is applied by offset printing to the release paper 18, in a registered relation with the previously printed yellow and blue portions of FIGS. 1 and 2, the color red, the portions of which are shown in varying shades in FIG. 4. Thus, a heavy shade of red, indicated in heavier outline in FIG. 4, provides for the red colored portions R of the finished design in FIG. 1. The lighter shade of red portions indicated in light outline in FIG. 4 are printed over certain of the yellow portions Y in FIG. 2 to provide for the flesh color of the portions, indicated as F in FIG. 1. The sequence of applying the different colors may be varied as desired.

It is well known that the colors provided by an offset printing process do not have the intensity or depth of like colors resulting from a silk screen printing process. However, it has been found that a visual approximation of the color intensity obtained by a silk screen printing can be imparted to offset printed color portions by bordering and accentuating these color portions with a silk screened dark or black color, along with applying the black color to designated portions within the offset printed color portions.

Thus, referring to FIG. 1, a black colored silk screen printing is indicated by the letters BL as forming a heavy or dark outline for the offset printed color portions R, Y, B and F. In addition it is seen that the black color has been applied over the previously blue colored hair portion of the character 15, resulting in the showing of a dark colored hair, the hairlines of which are indicated by the color blue. Additionally, it will be noted that the mouth and eyes of the characters 15, 16 and 17 are accentuated by the silk screened black color.

The material used for the silk screening step is a plastisol composed of a mixture of resin and a plasticizer. In the present invention, the plastisol mixture is comprised of a DOP plasticizer, a stabilizer of soybean oil, a PVC vinyl resin and black colored pigments. On the application of this plastisol mixture by the silk screen process to the color design of FIG. 1, the plastisol bleeds through the offset printed colors so as to substantially eliminate any appearance of such colors in the black silk screen printed portions. The finished color design, as shown in FIG. 1, is then subjeted to a heat drying process for a time period of about 10 seconds and at a temperature of about 350° F. to dry the plastisol.

Figure 5:
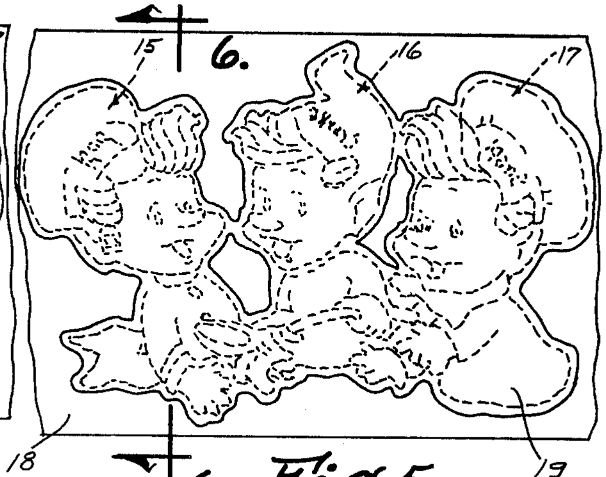
FIG. 5 shows the finished offset and silk screen printed design of FIG. 1 completed by the application thereover of a thin adhesive film material.
Figure 6:
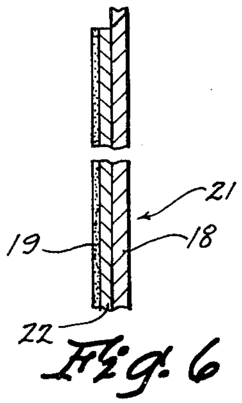
FIG. 6 is an enlarged foreshortened sectional view of the completed design transfer unit as seen on line 6—6 in FIG. 5.

On the completion of this drying operation, the design of FIG. 1 is then covered, by a silk screen printing process, with a film of white colored plastisol mixture. This film 19 (FIG. 5) is of a shape corresponding generally to the outer contour or border of the composite color design of FIG. 1. The plastisol mixture of the film 19 except for lacking a black colored pigment, is of the same composition as the dark colored plastisol previously applied to the design to bring out the colors therein. The design is then again subjected to a heat drying process for a time period of 10 seconds and at a temperature of about 350° F. The plastisol film 19 has adhesive characteristics for both the printed color design which it covers and to the fabric material to which the printed design is to be transferred. As illustrated in FIG. 6, the composite heat transfer unit, indicated generally as 21, is of a multi-layer construction comprised of the release paper 18, the offset printed color design and the accentuating black silk screened printing, indicated at 22, and finally the adhesive film 19.

Figure 8:
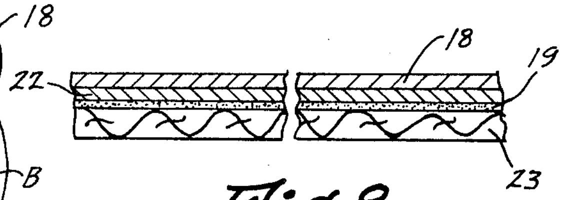
FIG. 8 is an enlarged foreshortened sectional view on line 8—8 of FIG. 7.
Figure 7:
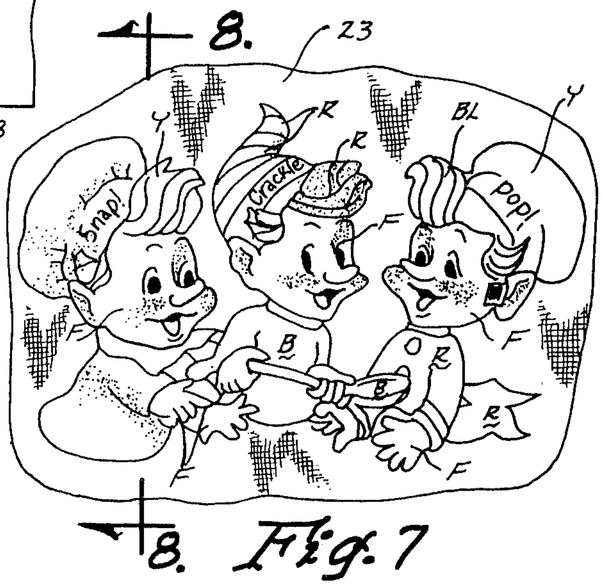
FIG. 7 shows the heat transfer unit of FIG. 5 applied to a fabric material.

In the transfer of the color design from the release paper 18 to a fabric material 23 (FIG. 8) the heat transfer unit 21 is placed over the fabric material with the adhesive film 19 positioned downwardly or against the fabric. On subjecting the transfer unit 19 to heat and the pressure of a press or iron, the adhesive film 19 becomes plasticized for adherence to the fabric material by melting or flowing therein. With the adhering of the film 19 to the fabric material, the colored design is then released from the paper 18 so that the composite design is transferred to the fabric material, as shown in FIG. 7, in a reverse relation relative to its showing in FIG. 1. During the transfer process the heat transfer is subjected to a pressure of not greater than about 50 pounds per square inch and a temperature of about 350° Fahrenheit. In the transfer process, the depth of the colored portions as provided initially in the preparation of the design of FIG. 1 is retained. The transferred design thus has a color intensity approximating in appearance the intensity of a design completely prepared by a silk screen process.

Although the invention has been described with respect to a preferred embodiment thereof, it is to be understood that it is not to be so limited since changes and modifications can be made therein which are within the full intended scope of this invention as defined by the appended claims.

I claim:

1. A method for printing a color design on a heat release paper for heat transfer from the paper to a fabric material comprising the steps of:

a. offset printing a design in color on the release paper, b. silk screening on said offset printed design a dark colored plastisol material to outline portions of the design to intensify the color appearance of such portions, c. heat drying the design a first time at a temperature of about 350° Fahrenheit for a time period of not more than about ten seconds, d. applying to the design an adhesive film having design and fabric material adhering characteristics, e. heat drying the design a second time at a temperature of about 350° Fahrenheit for a time period of not more than about 10 seconds.

2. The method according to claim 1 wherein:

a. the adhesive film is a white colored plastisol.

3. The method according to claim 1 wherein:

a. the dark colored plastisol bleeds through the offset printed design.

4. The method of claim 1 including the step of:

a. pressing the adhesive film against the fabric material with a pressure of not more than about 50 pounds per square inch and applying heat at a temperature of about 350° Fahrenheit to the release paper to release the printed design from the release paper to release the printed designed from the release paper for adherence to the fabric material.

* * * * *